Aug. 31, 1954 J. N. WELLS 2,687,897
GEAR-DRIVEN VELOCIPEDE
Filed April 17, 1953
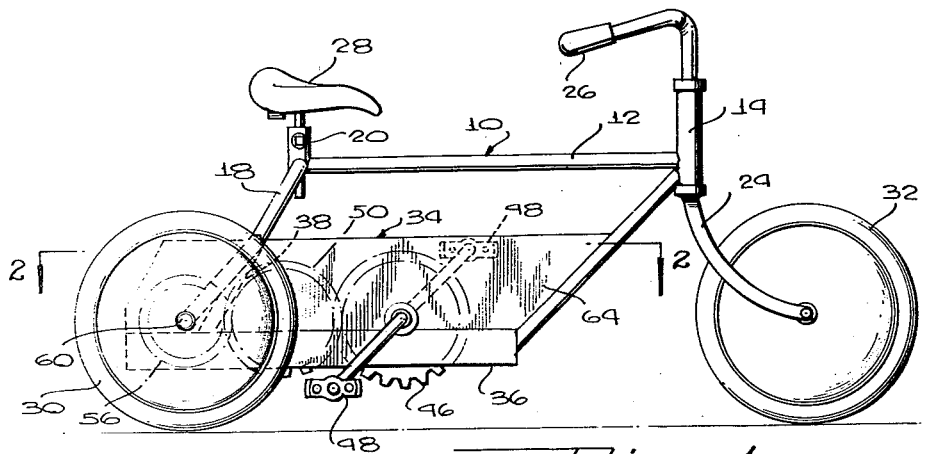
Fig. 1
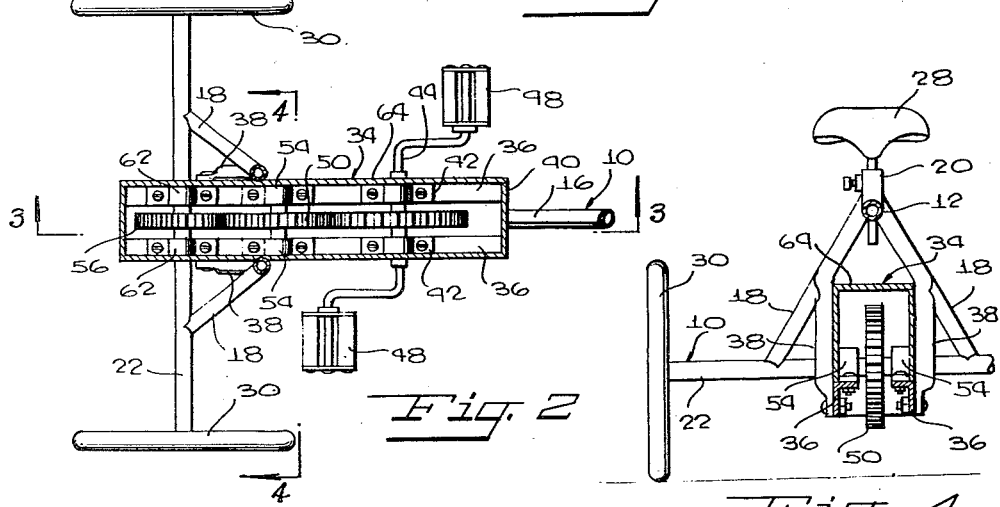
Fig. 2
Fig. 4
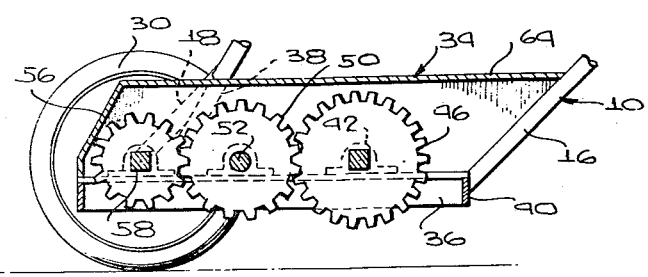
Fig. 3
INVENTOR.
John N. Wells
BY
McMorrow, Berman & Davidson
ATTORNEYS

UNITED STATES PATENT OFFICE 2,687,897

GEAR-DRIVEN VELOCIPEDE

John N. Wells, El Paso, Tex.

Application April 17, 1953, Serial No. 349,481

1 Claim. (Cl. 280—260)

This invention relates to velocipede construction, and more particularly, has reference to a geared drive assembly for a vehicle of this type.

Heretofore, it has been the practice to utilize a chain and sprocket drive means for velocipedes. While this arrangement has been satisfactory, in most instances, it is my belief that the gear drive constituting the present invention should prove even more satisfactory, by reason of the fact that less foot pressure is required.

It is recognized that gear drive means is not, broadly speaking, new in vehicles of the character described. However, the main object of the present invention is to provide a generally improved means of this type in which a train of gears will be utilized, the gears of said train being selected of a proper ratio, thus to produce a predetermined step-up in speed between the drive and driven shafts of the structure.

Another object of importance is to provide a gear drive for velocipedes in which the several gears will be disposed in a common plane aligned with the longitudinal center line of the velocipede, said gears rotating on short shafts disposed between closely spaced, parallel support bars, with the entire drive mechanism being housed in a compact casing designed to offer minimum interference to normal operation of the bicycle or tricycle.

Yet another object is to provide a gear drive as stated which will be relatively inexpensive, considering the benefits to be obtained from the use thereof, and which will, additionally, be rugged, simply designed, and substantially trouble free in operation.

Other objects will appear from the following description, the claim appended thereto, and from the annexed drawing, in which like reference characters designate like parts throughout the several views, and wherein:

Figure 1 is a side elevational view of a tricycle equipped with a gear drive formed in accordance with the present invention;

Figure 2 is a plan sectional view on line 2—2 of Figure 1;

Figure 3 is a longitudinal sectional view on line 3—3 of Figure 2; and

Figure 4 is a transverse sectional view on line 4—4 of Figure 2.

A velocipede frame has been designated generally at 10 and includes a horizontally extended main bar 12 rigid at its front end with a vertical guide sleeve 14. Also rigid at its front end with the guide sleeve is an inclined front brace 16. A pair of downwardly diverging, inclined, rear braces 18 is fixedly secured to the rear end of the main bar 12, and to a seat bar support sleeve 20.

The divergent lower ends of the rear braces 18, as shown in Figure 4, are fixedly secured to the end portions of a horizontally disposed, transversely extending, tubular axle housing 22.

Rotatable in the guide sleeve 14 is a steering bar having at its lower end the steering yoke 24. Handle bars 26 are rigid with the upper end of the steering bar. A seat 28 is provided with a depending seat bar extending into the sleeve 20.

It will be understood that an axle is rotatably journaled in the axle housing 22, and secured to the opposite ends of said axle are the rear wheels 30 of the tricycle. Of course, a tricycle has been illustrated merely by way of illustration, and it will be readily appreciated that the gear drive assembly constituting the present invention could be mounted, with equal facility, upon a bicycle or other velocipede.

Between the arms of the yoke 24 there is rotatably mounted the front wheel 32.

The gear drive assembly constituting the present invention has been designated generally by the reference numeral 34, and includes, as a main portion thereof, a pair of parallel, horizontally disposed, closely spaced side rails 36 of angle iron or similar material. Side rails 36 are extended between the front and rear braces 16, 18 of the velocipede, at the lower ends of said braces, and as particularly well shown in Figure 4, the rear braces 18 are formed, intermediate their ends, with depending, vertical branch brace members 38 bolted at their lower ends, or otherwise fixedly secured, to the rear end portions of the respective side rails 36.

The front ends of the side rails 36 are fixedly joined in transversely spaced relation by a cross bar 40, said cross bar being welded or otherwise made rigid with the lower or rear end of the front brace 16.

The side rails 36 are adapted to support spaced bearings, the bearings being arranged in pairs, with said pairs being spaced longitudinally of the side rails as best shown in Figure 2. As will be readily apparent from this figure of the drawings, a pair of front bearings 42 are secured to the front end portions of the side rails 36, and journaled in said front bearings is a drive shaft 44. The opposite ends of the drive shaft project beyond the bearings, as shown in Figure 2, and between the bearings, said drive shaft has a portion of non-circular cross section (Figure 3) on which is mounted a drive gear 46. The drive gear 46, of course, would have a center opening complementing the non-circular cross sectional shape of the midlength portion of the drive shaft 44, thus to connect the drive shaft and gear 46 for joint rotation.

The drive shaft 44 is adapted to be rotated by foot pedals 48, said pedals being provided at the opposite ends of the drive shaft, on oppositely extended cranks.

A middle gear has been designated by the reference numeral 50, and is slightly smaller in diameter, in the preferred embodiment of the invention, than the front or drive gear 46. Middle gear 50 has a circular center opening, receiving a shaft 52 journaled at its opposite ends in bearings 54 mounted upon the side rails 36 rearwardly of the bearings 42.

A rear or driven gear 56 is in mesh with the gear 50, and is smaller in diameter than said gear 50. Gear 56 has a noncircular center opening receiving a complementarily shaped midlength portion 58 of an axle shaft 60. Shaft 60 extends the length of the axle housing 22, wheels 30 being secured to said shaft 60 for rotation therewith. It will be understood that the connection between the ends of shaft 60 and its associated wheels 30 can be such as to permit coasting or free wheeling, as well as the use of coaster brakes. This, I believe, is sufficiently obvious as not to require special illustration, since driving connections of this type are well known in the art.

The shaft 60 may be journaled in bearings 62, spaced rearwardly of the bearings 54.

It is desired that the sides, top, front, and rear of the drive assembly illustrated and described herein be protectively enclosed in a housing 64. Housing 64 can be formed of sheet metal or the like, and is provided with vertical side walls rigid at their uuper edges with a top wall. The front and rear walls of the housing are inclined, preferably and along their lower longitudinal edges, the side walls of the housing are made rigid with the respective side rails 36.

It will be seen that the gear drive assembly constituting the present invention is so designed as to permit the same to be manufactured at relatively low cost. At the same time, the assembly is quite compact, and will not interfere in any way with the normal operation of the velocipede. Still further, the particular design of the assembly is such as to permit selected gear ratios to be employed. In other words, I believe that the particular formation and relative arrangement of the side rails 36 is such as to allow the bearings 42, 54, 62 to be secured to said side rails in selected, spaced relationships, depending upon the sizes of the several gears to be employed. In other words, if, for example, it should be desired that the drive gear 46 be of greater diameter than that shown, and that the middle and rear gears be smaller in diameter than those shown, the bearings might be readily adjusted longitudinally of the rails 36, to selected locations, to accommodate the particular gears selected, while still holding the several gears in proper mesh.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a velocipede the combination, with a frame including a horizontal main bar extending in a fore-and-aft direction, an inclined front brace having an upper, front end rigid with the front end of the main bar, a pair of downwardly diverging rear braces inclined correspondingly to the front brace and rigid at their upper, convergent ends with the rear end of the main bar, and an axle extending between and rotatably carried by the divergent lower ends of said rear braces, of a pair of parallel, closely spaced, horizontal side rails extending in a fore-and-aft direction between and fixedly secured to said front and rear braces, a train of coplanar gears journaled upon the side rails in the space between the same, said train having a drive gear at one end and a driven gear at its other end; pedal means operable by a user for rotating the drive gear, the driven gear being connected to the axle for rotation therewith; and a housing for the gears including a horizontal top wall overlying the gears, vertical side walls rigid along their upper and lower edges with the top wall and side rails respectively, and a front wall inclined correspondingly to said front brace and extending in longitudinal contact with said front brace, the rear braces straddling the housing, and including depending branch braces embracing the housing in contact with the respective side walls and fixed to said side rails.

References Cited in the file of this patent

UNITED STATES PATENTS

| Number | Name | Date |
|---|---|---|
| 1,594,071 | Schleich | July 27, 1926 |
| 2,131,288 | Kirkpatrick | Sept. 27, 1938 |